United States Patent [19]

Schneider

[11] Patent Number: 5,202,070
[45] Date of Patent: Apr. 13, 1993

[54] METHOD FOR MAKING COMPOSITE PRODUCTS HAVING AN INTEGRAL KNIT MATRIX

[76] Inventor: Robert J. Schneider, 1 Sunset Drive N., Chappaqua, N.Y. 10514

[21] Appl. No.: 649,634

[22] Filed: Feb. 1, 1991

[51] Int. Cl.$^5$ .............................................. B29C 41/20
[52] U.S. Cl. .................... 264/103; 264/136; 264/137; 264/257; 156/148
[58] Field of Search ............... 264/103, 257, 136, 137; 156/148

[56] References Cited

U.S. PATENT DOCUMENTS

| | | | |
|---|---|---|---|
| 3,087,201 | 4/1963 | Williams et al. | 264/257 |
| 3,093,160 | 6/1963 | Boggs | 264/257 |
| 3,849,847 | 11/1974 | Corbiere | 264/103 |
| 3,962,394 | 6/1976 | Hall | 264/257 |
| 4,123,832 | 11/1978 | Schultz | 156/148 |

Primary Examiner—Jan H. Silbaugh
Assistant Examiner—Catherine Timm
Attorney, Agent, or Firm—Nolte, Nolte and Hunter

[57] ABSTRACT

A method of forming a rigid composite varishaped product by knitting an integral fabric piece in the desired shape and impregnating the knitted piece with a selected settable impregnate which is then set; the products made from the method including the intermediate knitted products and the process for making the intermediate product and the knitting program for directing the needles of the knitting machine on which the intermediate product is made.

11 Claims, 7 Drawing Sheets

METHOD FOR MAKING COMPOSITE PRODUCTS HAVING AN INTEGRAL KNIT MATRIX

BACKGROUND OF THE INVENTION—FIELD OF THE INVENTION

The invention relates to a method of knitting composite fibers, such as, for example, nylon, glass fiber, or graphite, into complex shapes, more particularly, complex tubular shapes in the form of matrices for impregnation with organic or inorganic plastics and other settable moldable substances, including glass, organic polymers, natural and synthetic rubbers and resins. I refer generically to all of these as a curable impregnate. The resulting product is a light-weight, high strength composite for industrial and like uses. I refer to the product as a matrix with cured impregnate. The invention also relates to an industrial method of making matrices of fittings and the like, including knitting tubular elements on a knitting machine and by knitting techniques, to construct various shapes including tubular "T" fittings, tubular "Y" fittings, hemispheric and cubic shapes, used as a ready-to-fit matrix which may then be stretched over a mandril in the shape in which it was knitted before plastic is applied to it to form the finished composite product. It is further contemplated that other complex shapes such as helmets, protective clothing for sports or bullet-proof clothing be made by my novel method. A preferred illustration is shown on a flatbed knitting machine.

One technique which is performed within the purview of the invention is the making of tubular "T" or similar complex shaped matrices on a knitting machine. In the instance of a tubular "T", the tubular top or cross of the "T" is knitted first and then, while the vertical tubular leg is being knitted, the machine continues to knit flat gussets on either side of the vertical leg in order to maintain a proper measure of tension on courses knitted across the horizontal width (length of horizontal tube) of the knitted piece.

In a tubular offset shape with, for example, two extensions offset along parallel axes with an intermediate connecting portion, flat gussets may be provided along the tubular portions to maintain linear tension along the courses of the knitted piece while flechages are knitted for the course or turn at the junctures of the extensions with the intermediate connecting portion. The flechage may be knitted by conventional knitting techniques. One such technique is that of knitting successively, partial courses of gradually increasing or decreasing length to form a turn in the tubular portions. This technique maintains substantially the same tension throughout the knitting process so that flat gussets may not be necessary in some offsets.

The invention further relates to a method of making a light-weight, high strength composite; e.g., a pipe fitting consisting of the steps of knitting a matrix into a formed selected tubular shape to define a knitted fabric matrix in the shape of the product to be manufactured, inserting a mandril coated, if needed, with a release agent and applying the plastic material to the formed knitted fabric matrix.

Other knitting techniques known to those in the knitting arts and compatible with the knitting of tubular complex shapes for the purposes of the invention are: intarsia—knitting separate fields to achieve non-rectangular construction; presser foot and stitch pressers, which allow the knitting of non-rectangular pieces; inlay—to increase the amount of knitted material within the matrix and to control lateral stretch; reinforcement and placement intarsia to spot knit additional material where extra strength may be required; and plating; i.e., the knitting of two different fibers at the same time in such a manner as to make one fiber more prominent on one face of a knitted product.

The invention also relates to the matrices produced by such techniques and to the products formed by such matrices when impregnated with plastic or other curable impregnate.

DESCRIPTION OF THE PRIOR ART

Various prior art knitting arrangements with heat treating, and the like, as well as apparatus and method for their construction in general, are known. Exemplary of the prior art are the following:

| | |
|---|---|
| 4,115,562 | Gragson |
| 4,119,680 | Vachon |
| 4,571,959 | Chesebro, Jr. |
| 4,727,868 | Szycher |
| 4,748,078 | Dori |
| 4,842,661 | Miller |

Knitting Times, July 1989 at page 19, which references the description and details of the above patent to Chesebro, Jr. 4,571,959.

Chesebro, Jr. is cited as of general interest in the prior art of constructing a cap integrally formed from a seamless tubular blank, closing one end to form a crown of the cap and then cutting and sewing a lower edge of the tubular fabric to fashion the integral earflaps as an integral portion of the tubular blank. Gragson discloses resulting heat-treated fabrics of plastic which are heat set or heat-treated. Vachon relates to making binders and finishes for textile articles useful for imparting strength and durability to non-woven polyester fabrics, as well as modifying the hand and reducing the tendency of knitted and woven fabrics constructed from texturized polyester yarns to snag or to pick on sharp objects during wear. Szycher shows a wound dressing of knitted reinforcing fabric sandwiched between a given plastic material.

Dori shows a warp knitted lace fabric of a plurality of chain stitches and a ground insertion yarn, pattern yarn and/or other yarn interconnecting said chain stitches which are made by a heat bonding yarn carrying a low-melting thermoplastic synthetic resin covering and the heat bonding yarn being thermally joined to itself or to other component yarns. Miller shows a method and product of a binding of the edges of woven, non-woven and knitted articles, to prevent unravelling of a cuff edge.

These patents or known prior uses teach and disclose various types of knitting in combination with heat treating fabrics of sorts and of various manufacturers and the like as well as methods of their construction, but none of them, whether taken singly or in combination, disclose the mode of the invention. It is known to overlay a mandril with flat cut pieces of knitted fabric which is then impregnated with dissolved or molten plastic or resin. Such methods are labor intensive and unwieldly and result in non-uniform products.

DETAILED DESCRIPTION OF THE DRAWINGS

Figure 1:
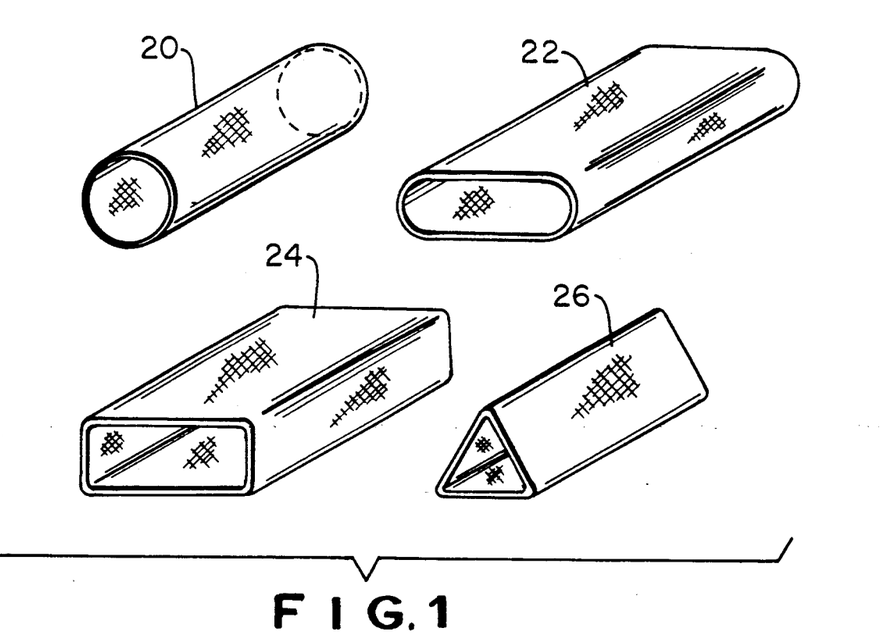
FIG. 1 illustrates a construction for making short conduits having varied cross sectional shapes.

Referring now to FIG. 1, there is shown a tubular jersey 20 and the several mandrils 22, 24, 26 whose circumference approximates that of the internal circumference of the jersey 20 or rather the internal circumference and shape of the final tubular product. When the jersey 20 is drawn over the mandril, it assumes the shape of the mandril and thereafter may be impregnated with plastic mix which, upon hardening or curing, forms with the knitted jersey a durable, hard composite structure. Before placing the jersey 20 over any of the mandrils 22, 24, 26, the mandril is coated with a release agent so that after impregnation and curing the mandril may be withdrawn from the composite. This step may be omitted where the mandril is formed or coated with a substance such as TEFLON ®, to which the impregnate will not adhere.

It should be here mentioned that it is well known in the plastic art to make plastic castings with appropriate release agents coating the mold for ready separation. The particular agents are well known in the art and are not, per se, a part of my invention, however, necessary they may be in carrying out the invention. However, the thread of the woven fabric must be compatible with the plastic. Generally, synthetic threads are preferable. Threads such as nylon, glass, ORLON (acrylonitrile fiber) TERYLENE (polyester fiber), DACRON (dimethyl terephthalate fiber), high tenacity viscous, yarns made from VINYON (vinyl chloride acetate), TEFLON (polytetrafluoroethylene) and the like should be employed with compatible resins as, for example, those used in glass fiber structures or protein and alginate resins. Nitrated cellulose as, for example, with RAYON fibers, rubber and BAKELITE (phenolic plastic) may be employed. I do not, of course, rule out the use of any of the natural fibers which can be treated and conditioned for use with suitable resins.

Figure 2A:
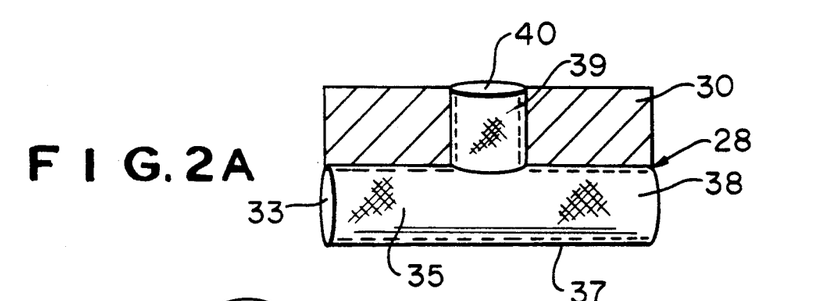
FIGS. 2A, 2B and 2C illustrate an embodiment for making a T-shaped construction such as might be used in a T-shaped union for pipes and tubing.
Figure 2B:
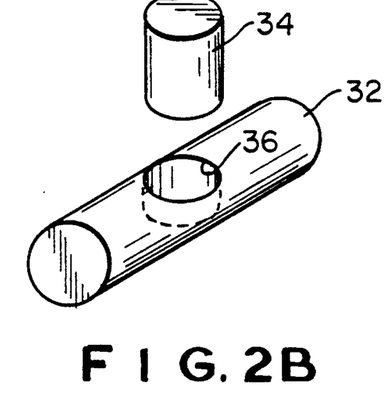
Figure 2C:
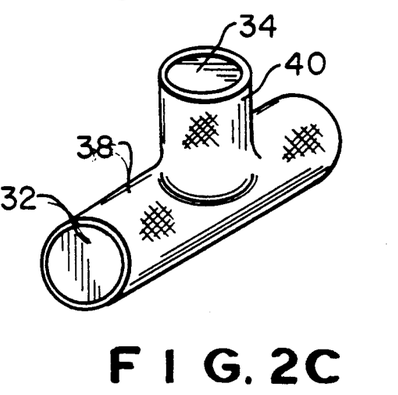

Referring now to FIGS. 2A, 2B and 2C, there is shown the means of constructing a T-coupling such as used for connecting pipes, preferably plastic pipes. In such applications, a nylon thread impregnated with a nylon resin provides great strength and durability. FIG. 2A shows a woven structure which may be made on a flatbed knitting machine by knitting the gussets 30 to obtain the T-shape. The tubular section 38 is formed by knitting the front and rear sets of needles for one or more courses to form the conjoint knit 37. Then the needles knit the front and rear fabric 33, 35. The gussets 30 leave the vertical tubular section 39.

The mandril section 32 (FIG. 2B) is constructed to connect with mandril section 34 which would preferably be done by threading 34 into the bore 36 formed in mandril 32. With the sections separated, the mandril 32, after coating with a release agent, may be inserted into the section 38 of jacket 28 and mandril section 34 (also coated with a release agant) is then attached to section 32 through bore 40 of section 39 of jacket 28. The assembled jacket on the mandril is illustrated in FIG. 2C. The whole is then impregnated with a suitable resin. When cured, the mandril sections 32, 34 are removed. It should be noted that the mandrils in many applications need not be threadingly united. A press fit or even mere abutting relationship suffices in many instances.

Figures 3, 4:
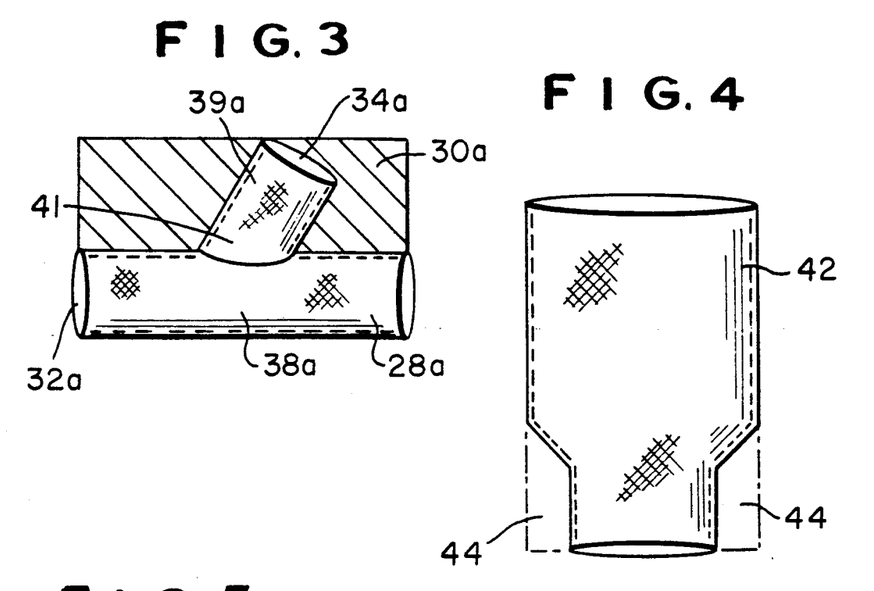
FIG. 3 shows a Y-shaped variation on the structure of FIGS. 2A, 2B and 2C.
FIGS. 4 and 5 illustrate other shapes that may be readily constructed.

Referring now to FIG. 3, there is shown a tubular Y jacket 28a having portions 38a and 39a formed by the gusset pieces 30a and a flechage 41. A mandril is formed similar to the mandril in FIG. 2B except that the threaded bore or other securing means for uniting or abutting sections 34a and 32a is angled as desired. Customarily, a structure of this nature would have a 45° angle. It should again be noted that it is not essential that the parts 34a be threaded into their parts 32a since, in many circumstances, merely a mating fit or an abutting juxtaposition is adequate. Also, in these configurations such as shown in FIGS. 2A, 2B and 2C and FIG. 3, the cross sectional area of the mandril sections need not be circular, but can be irregular or regular geometric shapes, such as square, rectangle, oval, triangle, polygonal and the like.

Figure 5:
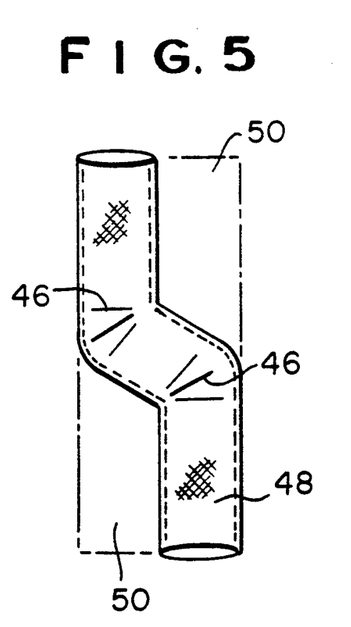

FIGS. 4 and 5 illustrate other configurations of the jacket and how they may be knitted. For example, in FIG. 4 a tubular jersey 42 has gussets 44 to fit in a tapered union or adaptor as might be used to join pipes of unequal diameter. The use of gussets 50 illustrated in FIG. 5 employ the flechages 46 to bend the jacket 48 into an S-shape or offset union while maintaining equal tension during knitting.

Figure 6:
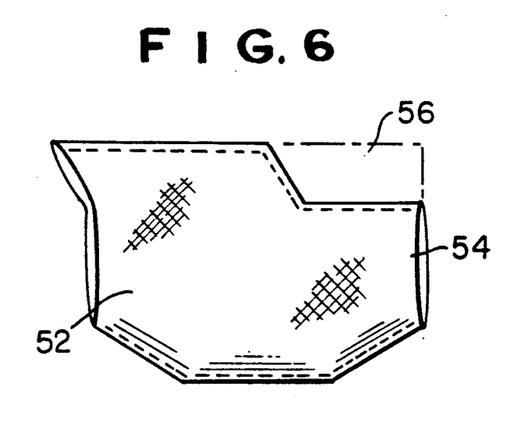
FIG. 6 shows a cap or helmut constructed in accordance with the invention.
Figure 7:
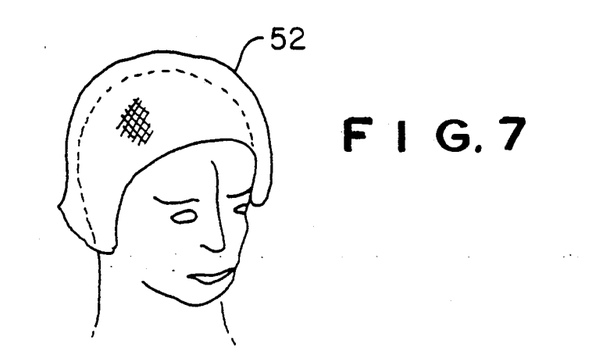
FIG. 7 shows a protective clothing, such as a flack vest, made with layers or flaps which can contain further protective material such a ceramic strips.

Referring now to FIGS. 6 and 7, a helmut form 52 can be made from the jacket 54 shaped by the gusset 56. As woven, cap 54 has been placed over a release coated head-shaped mandril and impregnated as explained for tubular configurations.

Figure 8:
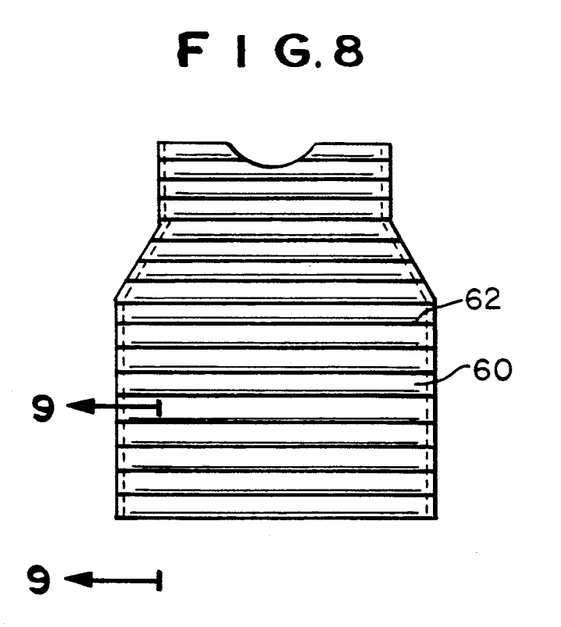
FIG. 8 is an embodiment for a protective vest.
Figure 9:
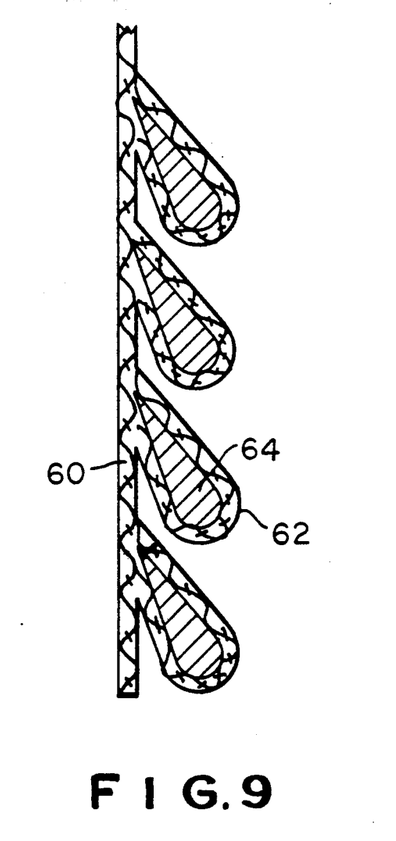
FIG. 9 is a partial sectional view taken on line 9—9 of FIG. 8.
Figure 10:
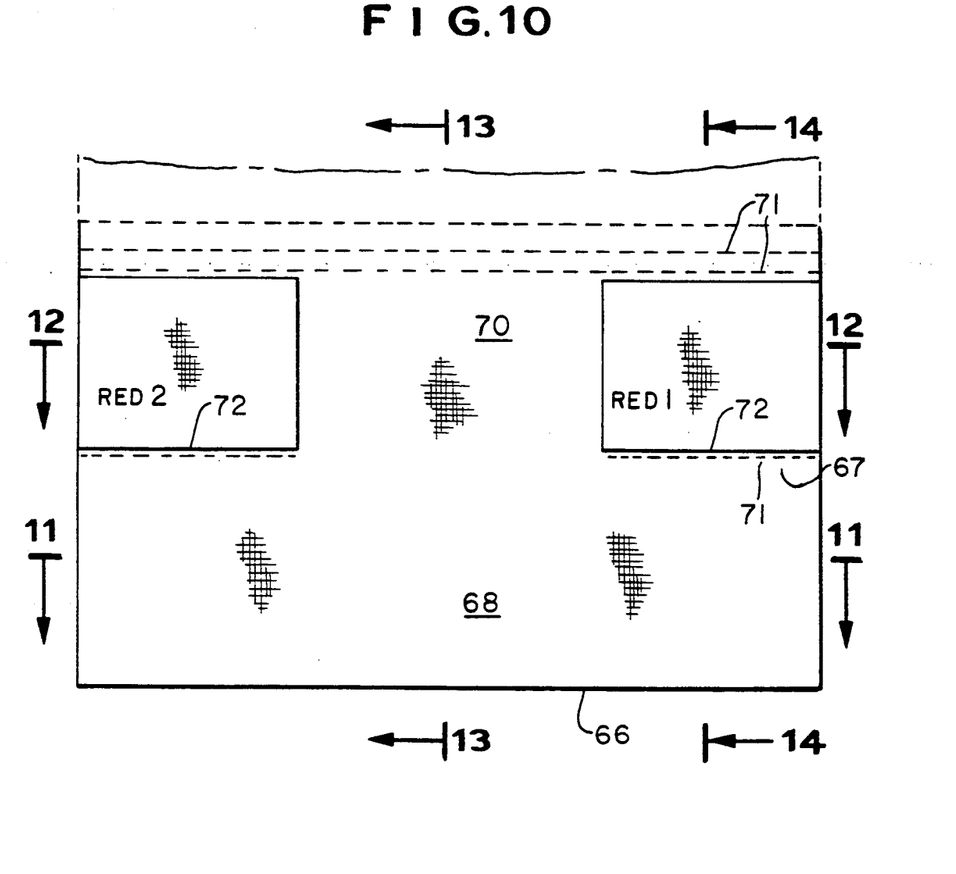
FIG. 10 is a front elevation showing in more detail the knitted structure for a T-union such as shown in FIGS. 2A, 2B and 2C.
Figure 11:
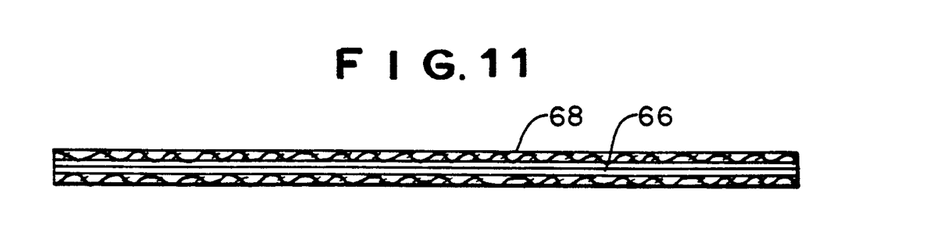
FIG. 11 is a horizontal section view taken on line 11—11 of FIG. 10.
Figure 12:
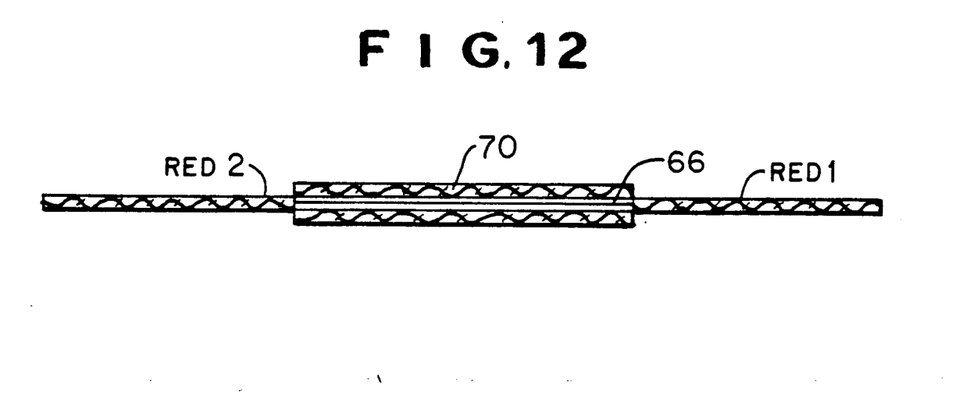
FIG. 12 is a horizontal view taken on line 12—12 of FIG. 10.
Figure 13:
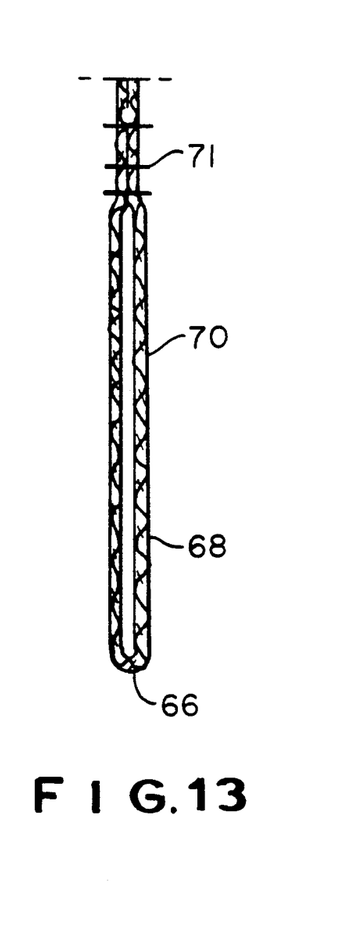
FIG. 13 is a vertical section taken on line 13—13 of FIG. 10.
Figure 14:
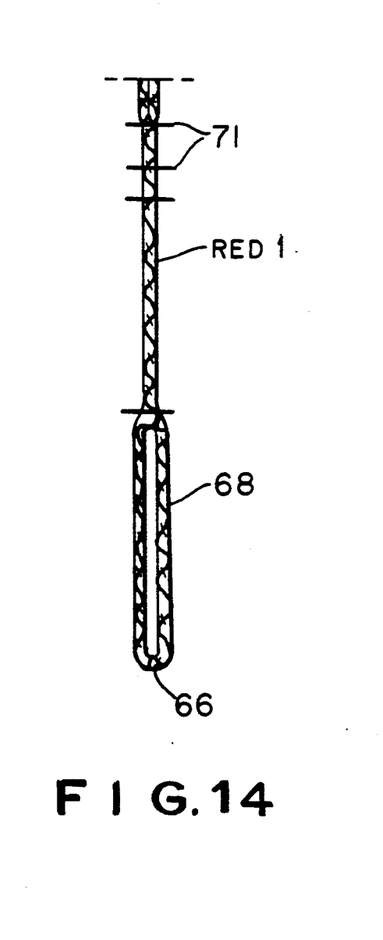
FIG. 14 is a vertical section taken on line 14—14 of FIG. 10.

Referring now to FIGS. 8-9, a structure for a protective clothing such as vests and the like is illustrated. The knitted jacket 60 is fitted over a coated bust or mandril (not shown) and impregnated with a resin, preferably of the type that hardens into a flexible structure. Alternatively, the jacket 60 may be woven on a flatbed knitting machine to provide tubular flaps 62 for insertion of flexible protective materials 64, metallic or plastic.

It should be here noted that the use of gussets and flechage is necessary for certain conformations to stabilize the fabric during knitting. However, some conformations and/or knitting threads may obviate or reduce the need of gussets and/or flechage. Moreover, other techniques of stabilizing known in the art may be employed such as, alternation of yarn feeders with a greater count, reinforcement of an area by "laying-in" without knitting which too adds material and stabilizes the area by restricting or preventing stretch (analogous to bridge suspender cable) and, of course, "placement intarsia" to add or insert knitting.

Referring now to FIGS. 10-15B, there is shown for illustration a knitted structure such as appears in FIG. 2A and a program for knitting it on a flatbed knitting machine. For convenience of understanding, green yarns are described for the T-shaped tubular structure and red yarn for the gussets. In practice, the strong, smooth separating thread 71 is preferably of a contrasting color for ready removal. The final knitted intermediate product 68, 70 entails only the green yarn and this yarn could be glass, synthetic or natural as desired for compatability with the plastic or resin in the final molded product. The gussets (red 1 and red 2) or "red" yarn can be any inexpensive yarn to perform the intermediate task of "holding" the shape of the product during knitting.

The illustration in FIGS. 10-14 is based exemplarily upon employing a span of sixty-four needles on the front and rear beds of a flatbed knitting machine. The length of the horizontal tubular structure 68 is established by the number of knitting needles employed, in this case 64. Diameter of tube 68 is established by the number of knitting cycles of the machine (specifically the number of cycles #2). With respect to the tube 70, the reverse is true. That is, the diameter of tube 70 is established by the number of needles employed (in this case 26; i.e., needles 20-46) and the length by the number of knitting cycles of the machine (specifically the number of cycles #7).

Figure 15A:
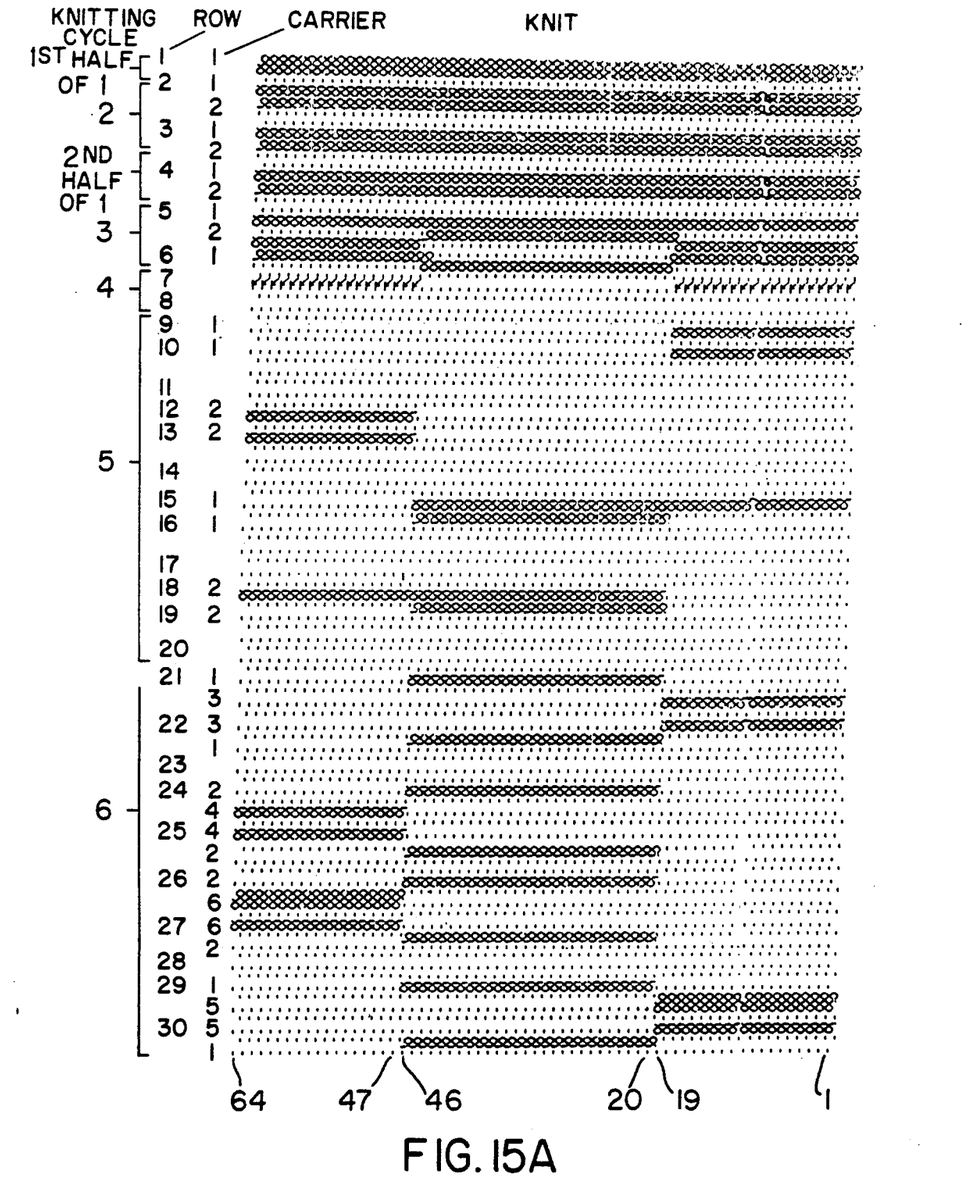
FIGS. 15A and 15B when joined together sequentially illustrate a computer program for the structures of FIGS. 10-14.

In FIG. 15A, it will be seen that the first half of knitting cycle 1 (row 1) comprises a rib stitch 66 using the front and rear beds of the machine to start horizontal tube 68.

In the following description, the phrase "carriage cycle" refers to the passage of the carriage from the right-hand side to the left-hand side and return to the right-hand side. The term "knitting cycle" refers to a particular knitting scheme or program some of which may be repeated numerous times. Each knitting cycle contains one or more "carriage cycles".

Figure 15B:
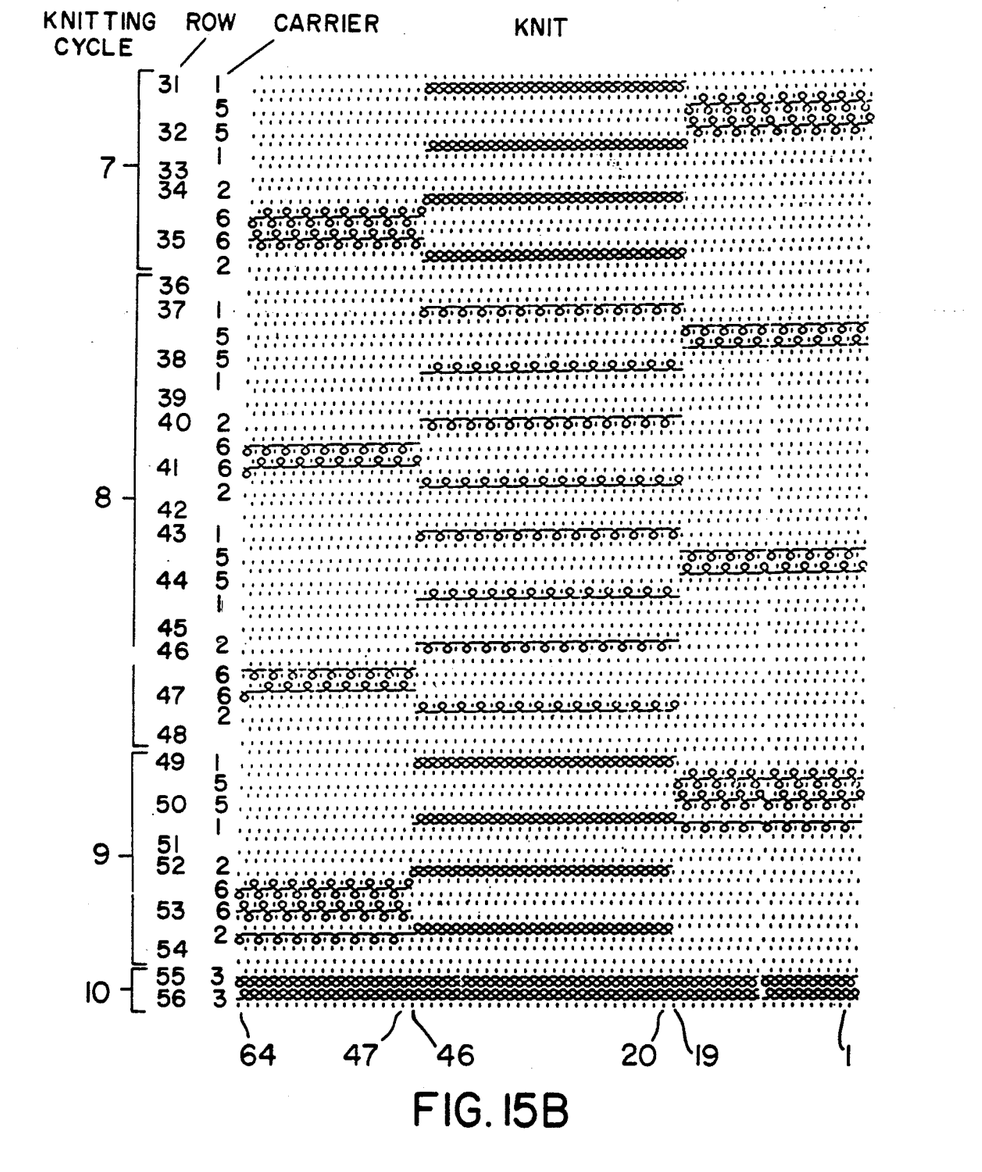

FIGS. 15A and 15B constitute an illustration or chart of a computer program for a flatbed knitting machine to produce the knitted product shown in FIGS. 2 and 10-14. These two FIGS. present sequential segments of the one chart or program. The first column to the left lists the knitting cycle, the second column, a carriage pass, i.e. a knitting row or ½ a carriage cycle. A carriage pass or transit (half of a carriage cycle) may go empty or may knit one or two rows. Thus, a full carriage cycle can knit zero to four rows. The odd numbers in the second column reflect travel of the carriage from right-to-left and the even numbers reflect travel from left-to-right. The third column contains numerals from 1 through 6 and is coded as follows: numeral 1 identifies green 1 yarn carried by green yarn carrier 1; numeral 2, green yarn 2 carrier 2; numeral 3 describes the separating thread and carrier used for the right-hand gusset Red 1; numeral 4 separating thread for the left-hand gusset Red 2; numeral 5 right-hand gusset yarn 1 (red 1); numeral 6, the left-hand gusset yarn 2 (red 2). These code numbers appear parenthetically in the following description. The remainder of the chart shows the knitting pattern on the sixty-four needles numbered sequentially from right to left. The downwardly pointed loops use the front bed and the upwardly pointed loops use the rear bed, dots only indicate no needle activity known in the art as "empty".

Referring now to the first six numbered knitting cycles illustrated in FIG. 15A, it is seen that the first half cycle is row 1 representing a rib stitch going to the left on the front and rear beds and using yarn green 1 (1). This is stitch 66 as designated in FIGS. 10-14 (37 on FIG. 2A). Cycle 2 which will knit the main part of tube 68 then begins. Row 2 shows yarn green 1 carrier (1) knitting the front bed followed by yarn green 2 (2) knitting the rear bed. Both are knitting a tubular (jersey) stitch on sixty-four needles of each bed. The transit of the carriage right-to-left, row 3, continues this pattern except, of course, that yarn carrier for green 2 (2) leads and is followed by yarn carrier for green 1 (1).

Cycle 2 is then repeated (the repetition is not illustrated) a sufficient number of times to determine the diameter of tube 68. This brings the knitting to position 67 on FIG. 10.

Then, the remaining or second half cycle of knitting cycle #1 is performed at knitting row 4 in preparation for carriage cycle 3, rows 5 and 6. On row 5, yarn carrier 1 (1) knits a jersey knit on the front bed all the way using all sixty-four needles followed by yarn carrier green 2 (2) knitting needles 1-19 and 47-64 on the front bed and needles 20-46 on the rear bed. On knitting row 6, yarn carrier 1 (1) performs the mirror image of (2) row 5, yarn carrier 2 (2) is left on the left side of the machine. In cycle 4 knitted loops of the rear bed are transferred (row 7) to the front bed needles 1-19 and 47-64. This is shown by the arrows in row 7. The carriage for row 8 returns empty. This closes horizontal tube 68 in the areas indicated at 72 in FIG. 10.

Knitting cycle 5 consists of twelve rows (9-20); i.e., six to and fro cycles of the carriage. Rows 9 and 10, right-hand or green closure with yarn green 1 (1). Row 11 is then empty and rows 12 and 13 knit the green yarn from carrier green 2 (2) on the left-hand closure needles 47-64.

Row 14 is then empty but leaves carrier 2 (2) on the left side of the machine. Row 15 knits on the front row from needles 1 through 46 and on the return 46 through 20 on the rear row. Both use green yarn 1. Row 17 is empty leaving the yarn carrier 1 on the right-hand side. Row 18 uses yarn carrier 2 (2) on needles 64 through 20 on the front row and row 19 on the rear bed knit a tubular stitch on needles 46 through 19, row 20 finishing cycle 5 is empty, but leaves yarn 2 (2) on the left side of the machine.

Knitting cycle 6 now begins. Row 21 using yarn carrier 1 (1) knits the tubular stitch on the front bed of the machine needles 20 through 46 followed by yarn carrier for separating thread −1 (right hand) (3) knitting also on the front bed on needles 1 through 19. Row 22 returns separating thread −1 (3) knitting on the front bed needles 19 through 1 followed by green yarn 1 (1) knitting on the rear bed of the machine a tubular stitch on needles 46 through 20. Row 23 is empty to allow pick-up of yarn carrier 2 (2) and separating thread −2 (4) for row 24 to knit on the front bed tubular stitch needles 46 through 20 followed by separating thread −2 (4) knitting a tubular stitch on the front bed of the machine needles 64 through 47. Row 25 somewhat reverses this procedure knitting green 2 (2) needles 20 through 46 on the rear bed followed by separating thread 2 (4) knitting needles 47 through 64 on the front bed. Row 26 knits green 2 (2) needles 46 through 20 on the front bed followed by red −2 (6) knitting a rib stitch on needles 64–47 of both beds. The pattern can now be followed readily for rows 27, 28, 29 and 30 to complete cycle 6 as illustrated in FIG. 15A.

Cycle 7, FIG. 15B, rows 31 through 36, is now commenced and repeated a sufficient number of times to establish the desired length of tube 70. As may be seen, rows 31 and 32 continues the tubular stitch of green 1 on the front and rear beds respectively while gusset red 1 (5) employs an interlock stitch on both beds of the machine using alternate needles of needles 1 through 19 and return. Row 33 is empty and rows 34 and 35 are the mirror image of rows 31 and 32 employing green 2 (2) and red 2 (6). Cycle 7 is completed by row 36 which is empty.

When sufficient numbers of cycle 7 have been run, cycle 8, rows 37 through 48, is begun. Row 37 employs green 1 (1) in a knit and miss stitch through even numbered needles of 20 through 46 followed by a knit and miss stitch by red gusset 1 (5) for odd numbered needles 1 through 19 on the front bed. Row 38 knits a mirror image of row 37 on odd numbered needles 45 through 21 (1) and even numbered needles 18 through 2 (5). Rows 40 and 41 are reverse images of rows 37 and 38 using red gusset 2 (6) and green 2 (2) while row 39 was an empty. Row 42 is also an empty and rows 43 and 44 are repeats of rows 37 and 38. Row 45 is an empty and rows 46 and 47 are repeats of rows 40 and 41. Row 48, an empty, ends cycle 8.

Cycle 9 begins with row 49 employing green 1 (1) and red 1 (5). Green 1 knits a tubular stitch on the front bed needles 20–46 followed by red 1 (5) knitting an interlock on the front and rear beds needles 1–19. 50 knits an interlock on needles 19 to 1 with red gusset 1 (5) followed by green 1 knitting a tubular stitch on the rear bed of the machine needles 46 through 20 and continuing as a knit and skip on needles 19 through 1. 51 is an empty and 52 and 53 are mirror images of 49 and 50 employing, however, green 2 (2) and red gusset 2 (6).

Cycle 10 consists of rows 55 and 56 which employ separating yarn 1 (3) to knit on all needles of the front bed and return as row 56 on all needles of the rear bed. This constitutes the entire production of one product. The second product continues as the first half of cycle 1, following row 56 of cycle 10.

It will be understood that I have illuminated one program for making the article of FIGS. 2 and 10–14. The integral knit product is maintained in shape by gussets. It may also, as in FIGS. 3 and 5, be shaped by employing flechage 46 knitting sustained in shape during knitting by gussets 50 or the like.

My invention is defined and limited in scope by the appended claims.

I claim:

1. The method of forming a rigid composite varied shaped product comprising performing in a selected order the following steps:

selecting a mandril of a desired shape and size for said product;
   knitting an enclosed unitary fabric and maintaining substantially the same tension during knitting to conform said fabric in shape and size to said product;
   inserting said mandril into said fabric;
   impregnating said unitary fabric with a selected settable substance;
   setting said substance whilst said impregnated fabric is supported on said mandril; and
   removing said mandril from said product formed as a composite of said fabric and said set substance.

2. The method set forth in claim 1 further characterized by coating said mandril with a release agent prior to inserting said mandril into said fabric.

3. The method set forth in claim 1 further characterized in that said mandril is formed of segmental separable components positioned adjacent each other in the selected shape.

4. The method as set forth in claim 3 and further characterized in that at least two of said segmental components are threadingly connectable to each other to support said shaped fabric.

5. The method of forming a rigid composite varied shaped product comprising:
   knitting an enclosed fabric on a knitting machine,
   knitting gussets in said fabric to tension a predetermined irregular selected shape while knitting said enclosed fabric,
   securing said gussets during knitting with a separating thread,
   forming a mandril to correspond to said selected shape,
   removing said separating thread and said gussets,
   inserting said mandril into said knitted fabric,
   impregnating said fabric with a settable substance,
   setting said substance and removing said mandril to provide said rigid composite product.

6. The method of claim 5 further characterized by coating said mandril with a release agent prior to inserting said mandril.

7. The method of claim 1 or 5 further characterized in that a flatbed knitting machine is selected and employed to knit said fabric.

8. The method of claim 5 further characterized in that said curable substance is selected from the group consisting of organic plastics and inorganic plastics.

9. The method of claim 5 further characterized in that said settable substance is thermal setting.

10. The method set forth in claims 1 or 5 and further characterized in that said step of impregnating said knitted piece is performed after said knitted fabric has been placed about said mandril.

11. The method of claim 5 and further characterized in that said fabric is endlessly and repetitiously knitted and a second separating thread is knitted between each repetitive portion and said second separate thread is removed for supplying a repetitive portion to a mandril.

* * * * *